United States Patent [19]

Martineau

[11] 4,171,819

[45] Oct. 23, 1979

[54] SEAL FOR FROZEN CONFECTION FREEZER

[75] Inventor: Tom N. Martineau, Kiel, Wis.

[73] Assignee: Stoelting, Inc., Kiel, Wis.

[21] Appl. No.: 937,345

[22] Filed: Aug. 28, 1978

[51] Int. Cl.² ............................................. F16J 15/36
[52] U.S. Cl. ...................... 277/88; 277/92;
  277/93 R; 277/170; 277/212 C; 62/342;
  366/320
[58] Field of Search .................................. 277/40–43,
  277/81 R, 84, 85, 88, 89, 92, 93 R, 95, 165,
  170–172, 205, 212 C, 212 FB, 212 R; 62/233,
  342, 343; 366/320

[56] References Cited

U.S. PATENT DOCUMENTS

| | | | |
|---|---|---|---|
| 1,931,733 | 10/1933 | Leibing | 277/41 X |
| 2,710,206 | 6/1955 | Huber | 277/92 |
| 2,746,730 | 5/1956 | Swenson et al. | 62/343 X |
| 2,924,952 | 2/1960 | Swenson et al. | 62/233 X |
| 3,388,914 | 6/1968 | Dahlgren et al. | 277/84 |
| 3,655,205 | 4/1972 | Petersen | 277/41 X |
| 3,905,607 | 9/1975 | Maguire et al. | 277/92 |

FOREIGN PATENT DOCUMENTS 998478  7/1965  United Kingdom ................... 277/42

Primary Examiner—Robert S. Ward, Jr.
Attorney, Agent, or Firm—Joseph P. House, Jr.

[57] ABSTRACT

The freezing chamber of a frozen or semi-frozen confection freezer has a mixing rotor having a shaft which extends through an opening in a wall. The seal between the shaft and wall comprises an elastomeric cup having a rim engaged with the wall about said opening. The cup has a hub engaged with the shaft and a yieldable skirt between the hub and the rim. The hub has a socket which receives a metal ring with an oblique wear surface. An O-ring is engaged between a fillet on the shaft and the oblique wear surface on the ring whereby the cup is self-centering with respect to the shaft, notwithstanding any tendency of the shaft to nutate.

7 Claims, 3 Drawing Figures

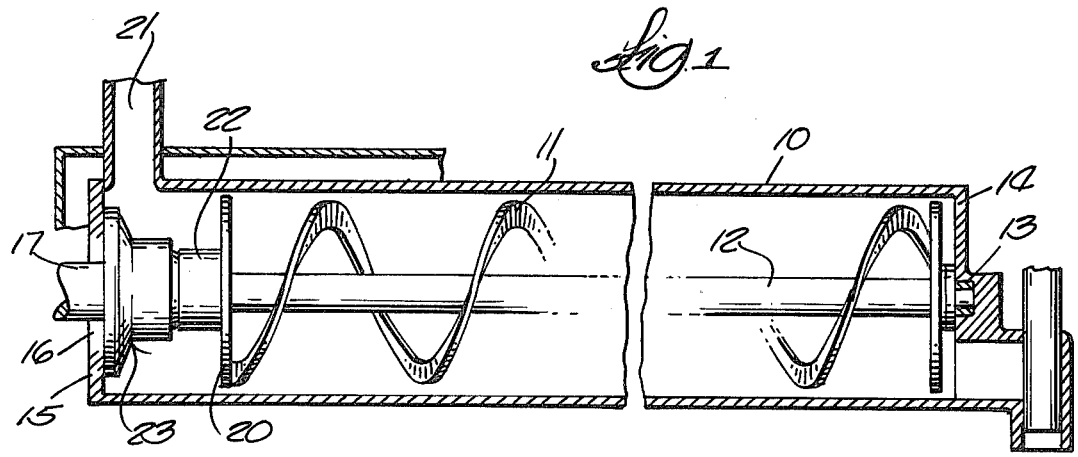
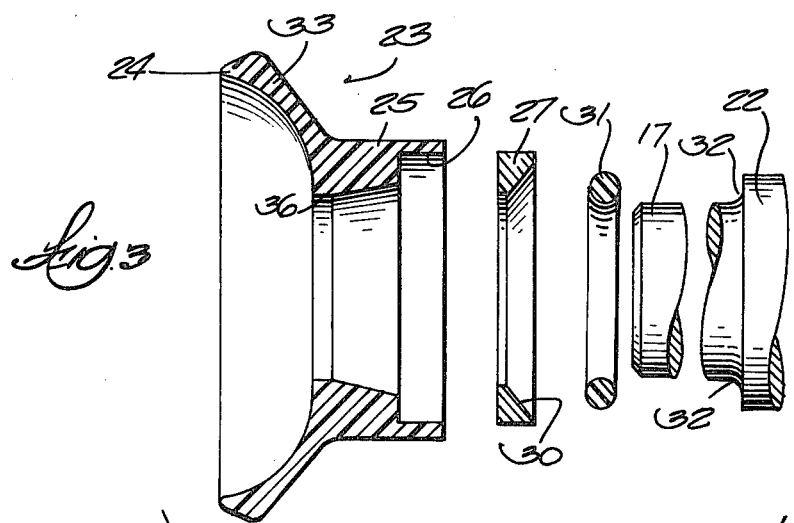
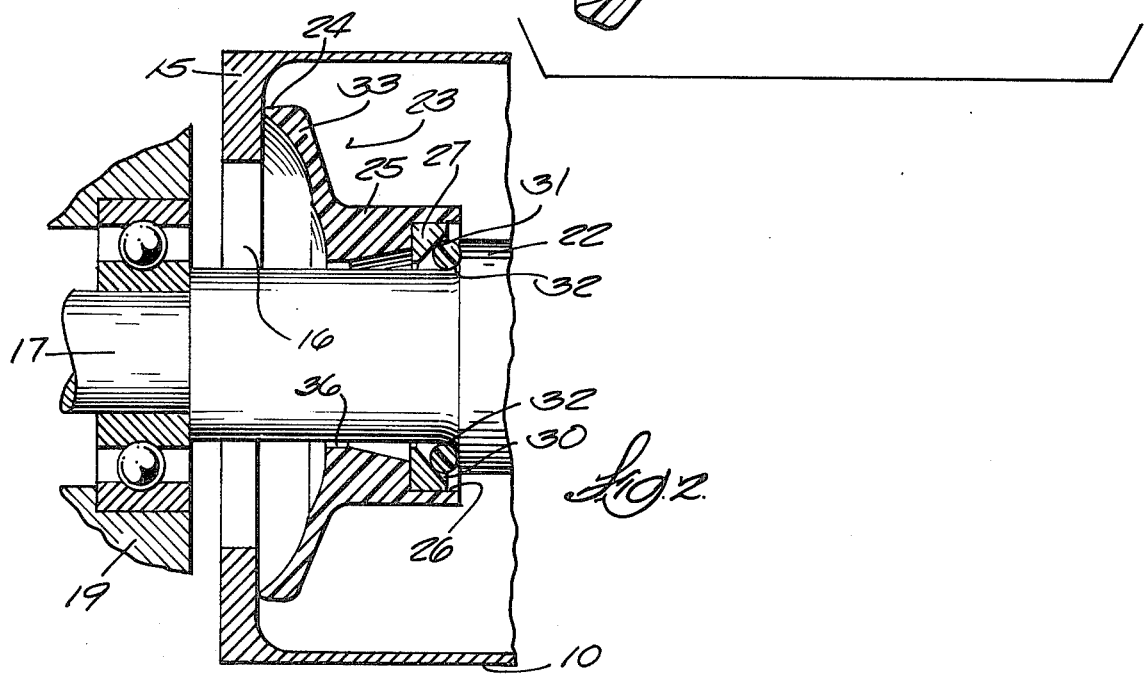

SEAL FOR FROZEN CONFECTION FREEZER

BACKGROUND OF THE INVENTION

U.S. Pat. Nos. 2,746,730 and 2,924,952 to Swenson et al. show prior art frozen or semi-frozen confection freezing chambers having conventional rubber cup seals between the mixing rotor shaft and a wall having an opening through which the shaft extends. Such seals do not accommodate any tendency of the shaft to nutate when the shaft bearing becomes worn and leakage tends to develop between the seal and the shaft.

SUMMARY OF THE INVENTION

In accordance with the present invention, the hub of the cup seal has a metal wear ring with an oblique surface engaged with an O-ring in contact with the shaft. Accordingly, the cup seal is self-centering with respect to the shaft, notwithstanding any tendency of the shaft to nutate. The O-ring maintains good sealing contact with both the shaft and the cup seal and no leakage will develop even after extended use.

Other objects features and advantages of the invention will appear from the disclosure hereof.

DESCRIPTION OF THE DRAWINGS

FIG. 1 is a vertical cross section taken through the freezing chamber of a frozen confection freezer having a seal embodying the present invention.

FIG. 2 is an enlarged fragmentary cross section taken through a seal embodying the present invention.

FIG. 3 is an exploded view showing parts of the seal in spaced apart relation.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

A frozen or semi-frozen confection freezer chamber 10 contains a ribbon auger 11 or any other suitable type of frozen confection mixing rotor. The rotor 11 is mounted on a shaft 12, one end of which is mounted on a bearing 13 in end wall 14 of the chamber 10.

The opposite end wall 15 of chamber 14 has an opening 16 through which an extension 17 of shaft 12 extends. Shaft extension 17 is mounted on bearing 18 supported on bracket 19 from the chamber 10.

As is typical in this art, shaft 12 carries a divider plate 20 which provides a partial partition between the portion of the freezing chamber 10 in which the auger 11 rotates and a portion of the chamber 10 which receives frozen confection ingredients through a fillpipe 21. A shaft enlargement 22 connected to the divider plate 20 intervenes between the shaft 12 and shaft extension 17.

A seal between the shaft and the end wall 15 of the chamber 10 comprises an elastomeric cup 23 which is typically made of rubber, plastic, or other resilient material. Cup seal 23 has at one end a rim 24 which bears against the wall 15 about the opening 16. At its other end, the cup 23 has a hub 25 with a socket 26 which provides a mounting seat for a metal wear ring 27. Hub 25 and rim 24 are interconnected by a skirt 33. Wear ring 27 is desirably made of stainless steel and has an oblique wear surface 30 against which O-ring 31 bears.

The intersection of the shaft extension 17 and shaft enlargement 22 is provided with a fillet or shoulder 32 against which the O-ring 31 seats as shown in FIG. 2.

When the parts are assembled, the spacing between the shaft shoulder 32 and the end wall 15 of the freezing chamber 10 is somewhat less than the spacing between the seal rim 24 and its O-ring 31 when seal skirt 33 is unstressed. Accordingly, from its relaxed or unstressed position as shown in FIG. 3, the seal skirt 33 is stressed or compressed to its somewhat flattened position shown in FIG. 2. When cup 23 is thus stressed, the rim 24 resiliently presses against the wall 15 and the O-ring 31 resiliently presses against the shaft shoulder 32 and against the oblique wear surface 30 on the ring 27. Accordingly, the cup seal 23 prevents leakage of the liquid or partially frozen confection from the chamber 10 into or through opening 16.

If the shaft 12, 17, 22 develops any tendency to nutate or rotate eccentrically about its axis, if and when its bearings become worn or for any other reason, for example, manufacturing tolerances in the parts, loose fit between interconnected sections of the auger drive shaft, etc., the resilient skirt 33 of the cup seal 23 will simply yield radially to accommodate such nutation. Moreover, the oblique face 30 on the ring 27 will maintain both axial and radial pressure components on the O-ring 31 to keep the hub 25 of cup seal 23 centered with respect to the shaft, notwithstanding any such tendency of the shaft to nutate. But for this oblique surface 30, the O-ring 31 would tend to shift its line of contact with the hub of the sealing cup and develop wear and leakage therebetween.

Because of the relatively large friction surfaces between the O-ring 31 and the shaft shoulder or fillet 32, the O-ring will normally be relatively stationary with respect to the shaft. For this purpose the radius of fillet 32 is desirably the same as the radius of the O-ring 31, for good frictional engagement therebetween. The stainless steel ring wear surface 30 will have substantially less friction against the O-ring 21 and movement between the O-ring and cup seal will take place at the oblique wear surface 30.

In the illustrated embodiment, oblique wear surface 30 is at a 45° angle to the axis of the shaft, this being a desirable arrangement.

Wear ring 27 is desirably bonded with a suitable adhesive to the seal hub 25, to preclude shifting of the ring with respect to its socket 26 in hub 25.

Seal hub 25 is also provided with an annular positioning ridge 36 spaced slightly from the shaft 17. During parts assembly, ridge 36 locates and orients the cup seal with its rim 24 approximately in its final intended position with respect to wall 15. The clearance between the ridge 36 and shaft 17 accommodates for any nutation of the shaft.

In its unstressed condition, as shown in FIG. 3, the outer periphery of rim 24 is inclined at an angle (about 25° in the illustrated embodiment) to the shaft axis. By the same token, the rim periphery is inclined to the wall 15 (about 65° in the illustrated embodiment). However, in its stressed condition, as shown in FIG. 2, the outer periphery of rim 24 is substantially perpendicular to wall 15 and is substantially parallel to the shaft axis. Accordingly, the stress stored in the cup seal 23 in deforming it from its condition shown in FIG. 3 to its condition shown in FIG. 2 imposes the pressure of the seal rim directly against the wall 15 with no substantial lateral component. This results in tighter seal between the seal cup 23 and wall 15.

I claim:

1. In a frozen or semi-frozen confection freezer having a freezing chamber with a mixing rotor having a shaft therein, a wall having an opening through which the shaft extends and a seal between the shaft and wall to seal confection in said chamber from said opening, the improvement in which said seal comprises an elastomeric cup having a rim engaged with the wall about said opening, a hub adapted to be engaged with the shaft and a yieldable skirt between the hub and rim, a metal ring and means mounting the ring on the hub, said ring having an oblique wear surface, an O-ring in contact with said oblique metal wear surface on the ring and in contact with said shaft whereby the cup is self-centering with respect to the shaft notwithstanding any tendency of the shaft to nutate.

2. The improvement of claim 1 in which said shaft has a shoulder contacting the O-ring.

3. The improvement of claim 1 in which the spacing of the wall from the shaft shoulder is less than the spacing of the seal cup rim from the O-ring when the skirt is unstressed, whereby the cup will press resiliently against the wall and O-ring.

4. The improvement of claim 1 in which the means mounting the ring on the hub comprises said hub having a socket into which said metal ring seats.

5. The improvement of claim 1 in which said shaft has a shoulder with a radius substantially the same as the radius of the O-ring and contacting the O-ring for good frictional engagement.

6. The improvement of claim 1 in which said hub is provided with a positioning ridge spaced slightly from the shaft.

7. The improvement of claim 1 in which said rim has a periphery inclined at an angle to the wall in the unstressed condition of the seal cup and which is substantially perpendicular to the wall in the stressed condition of the seal cup.

* * * * *